United States Patent
Yanagisawa

(10) Patent No.: US 10,497,160 B2
(45) Date of Patent: Dec. 3, 2019

(54) INFORMATION PROCESSING APPARATUS AND INFORMATION PROCESSING METHOD

(71) Applicant: CANON KABUSHIKI KAISHA, Tokyo (JP)

(72) Inventor: Takafumi Yanagisawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/842,613

(22) Filed: Dec. 14, 2017

(65) Prior Publication Data

US 2018/0182148 A1    Jun. 28, 2018

(30) Foreign Application Priority Data

Dec. 26, 2016 (JP) .................. 2016-251042

(51) Int. Cl.
| | |
|---|---|
| *G06T 11/60* | (2006.01) |
| *H04N 5/232* | (2006.01) |
| *H04N 5/247* | (2006.01) |
| *G06T 7/11* | (2017.01) |
| *H04N 7/18* | (2006.01) |
| *G06F 3/0484* | (2013.01) |

(52) U.S. Cl.
CPC .......... *G06T 11/60* (2013.01); *G06F 3/04845* (2013.01); *G06T 7/11* (2017.01); *H04N 5/23203* (2013.01); *H04N 5/23238* (2013.01); *H04N 5/23293* (2013.01); *H04N 5/247* (2013.01); *H04N 7/183* (2013.01); *G06T 2207/10004* (2013.01); *H04N 5/23296* (2013.01)

(58) Field of Classification Search
CPC . G06T 11/60; G06T 7/11; G06T 2207/10004; G06F 3/04845; H04N 5/23203; H04N 5/23238; H04N 5/23293; H04N 5/247; H04N 7/183; H04N 5/23296
See application file for complete search history.

(56) References Cited

U.S. PATENT DOCUMENTS

| | | | |
|---|---|---|---|
| 2003/0103063 A1* | 6/2003 | Mojaver | G06T 3/00 345/647 |
| 2006/0179119 A1* | 8/2006 | Kurosawa | H04L 67/125 709/217 |
| 2011/0090246 A1 | 4/2011 | Matsunaga | |
| 2012/0057037 A1* | 3/2012 | Ono | H04N 5/225 348/211.9 |
| 2012/0062695 A1* | 3/2012 | Sakaki | G08B 13/19691 348/36 |
| 2013/0293672 A1 | 11/2013 | Suzuki | |

(Continued)

FOREIGN PATENT DOCUMENTS

JP    2016-63397 A    4/2016

*Primary Examiner* — Yu Chen
(74) *Attorney, Agent, or Firm* — Canon U.S.A., Inc. IP Division

(57) ABSTRACT

An information processing apparatus displays an image relating to image data captured by an image capturing unit and includes a first display control unit that superimposes a first object on the image, the first object indicating a position corresponding to a partial image corresponding to a part of the image captured by the image capturing unit, and a second display control unit that superimposes a second object on the image, the second object indicating a direction for enabling a position of the partial image to be moved on the image.

16 Claims, 13 Drawing Sheets

(56) References Cited

U.S. PATENT DOCUMENTS

| | | |
|---|---|---|
| 2014/0049655 A1 | 2/2014 | Iwasaki |
| 2015/0296131 A1* | 10/2015 | Onsen ................ H04N 5/23206 |
| | | 348/207.11 |
| 2016/0048992 A1* | 2/2016 | Irie ....................... G06F 3/0488 |
| | | 382/295 |
| 2016/0277679 A1 | 9/2016 | Kimura |
| 2017/0169541 A1* | 6/2017 | Funami ............... G06F 3/04845 |

* cited by examiner

INFORMATION PROCESSING APPARATUS AND INFORMATION PROCESSING METHOD

BACKGROUND

Field

The present disclosure relates to an information processing apparatus and an information processing method.

Description of the Related Art

In recent years, with expansion of the network camera market, various types of network cameras have been manufactured. One type of network camera can be an omni-directional network camera (hereinafter, omni-directional camera) including a fisheye lens attached thereto so that a user has a 360 degree view without any dead angles/spots. An image captured by such an omni-directional camera is largely distorted, which is not suitable for monitoring applications. Generally, to address this, a "fisheye image" and a "segmented image" are displayed side by side, where the fisheye image displays all of the field of view and the segmented image displays a less-distorted image, like an image captured by a normal camera, obtained by segmenting and dewarping a part of the fisheye image. However, when the segmented image and the fisheye image are displayed side by side, the positional relationship therebetween is not easily recognized.

In order to address this, a technology is provided that displays which part of a fisheye image is cut out for a segmented image, as described in Japanese Patent Laid-Open No. 2016-63397.

When a monitoring target moves, a person in charge of monitoring can trace the monitoring target by performing pan-tilt operations on an image at a segmentation position (hereinafter, segmented image). In this case, if an omni-directional camera is installed on a ceiling, when a pan operation is performed on the segmented image, the pan operation moves on the circumference of a circle having a line from the current segmentation position to the center of the fisheye as a radius on the fisheye image. When a tilt operation is performed thereon, the tilt operation can move along a straight line connecting the current position and the center of the fisheye.

This can result in difficulty recognizing the positional relationship between one image and an image corresponding to a part of the image.

SUMMARY

An information processing apparatus displays an image relating to image data captured by an image capturing unit and includes a first display control unit configured to superimpose a first object on the image, the first object indicating a position corresponding to a partial image corresponding to a part of the image captured by the image capturing unit, and a second display control unit configured to superimpose a second object on the image, the second object indicating a direction for enabling a position of the partial image to be moved on the image.

Further features will become apparent from the following description of exemplary embodiments with reference to the attached drawings.

DESCRIPTION OF THE EMBODIMENTS

Embodiments will be described below with reference to drawings. A fisheye image captured using a fisheye lens and an image (partial image) segmented from the fisheye image will be described, for example, according to the following embodiments. These embodiments are also applicable to a PTZ (pan, tilt, zoom) camera with which an image capturing direction can be changed to a pan direction and a tilt direction. In this case, a panorama image representing a maximum range that can be captured by changing the image capturing direction to a pan direction and a tilt direction can be replaced by a fisheye image. The image being currently captured can be replaced by a segmented image (partial image). These embodiments are also applicable to a captured image obtained by a fixed camera not supporting PT drive and an image cut out from the captured image.

First Embodiment

Figure 1:
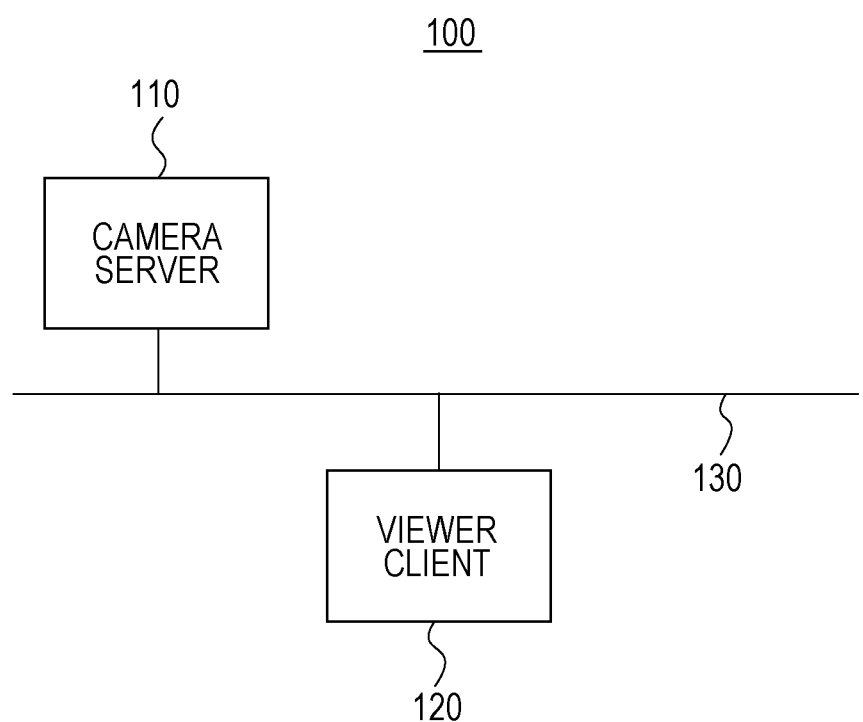
FIG. 1 illustrates an exemplary system configuration of an information processing system.

FIG. 1 illustrates an exemplary system configuration of an information processing system.

The information processing system 100 includes a camera server 110, a viewer client 120, and a network 130. The camera server 110 and the viewer client 120 are example information processing apparatuses.

The camera server 110 distributes image data of an image captured by a camera (network camera) over the network 130.

The viewer client 120 is configured to access the camera server 110, change settings for the camera, process image data obtained as a result of image capturing by the camera or process stored image data, for example, and display an image based on the processed image data.

The information processing system 100 illustrated in FIG. 1 includes only the viewer client 120 as a client. However, the information processing system 100 can include other clients, in addition to the viewer client 120, which access the camera server 110 for receiving and storing image data.

The network 130 is configured to communicably connect the camera server 110 and the viewer client 120, for example, and can include a plurality of routers, switches, and cables satisfying a communication standard such as Ethernet. According to the present embodiment, the network 130 can be based on any communication standard and can include any size and any configuration if the network 130 enables smooth communication between the camera server 110 and the viewer client 120. Therefore, any type of network, from the Internet to a LAN (local area network), is applicable as the network 130.

Figure 2:
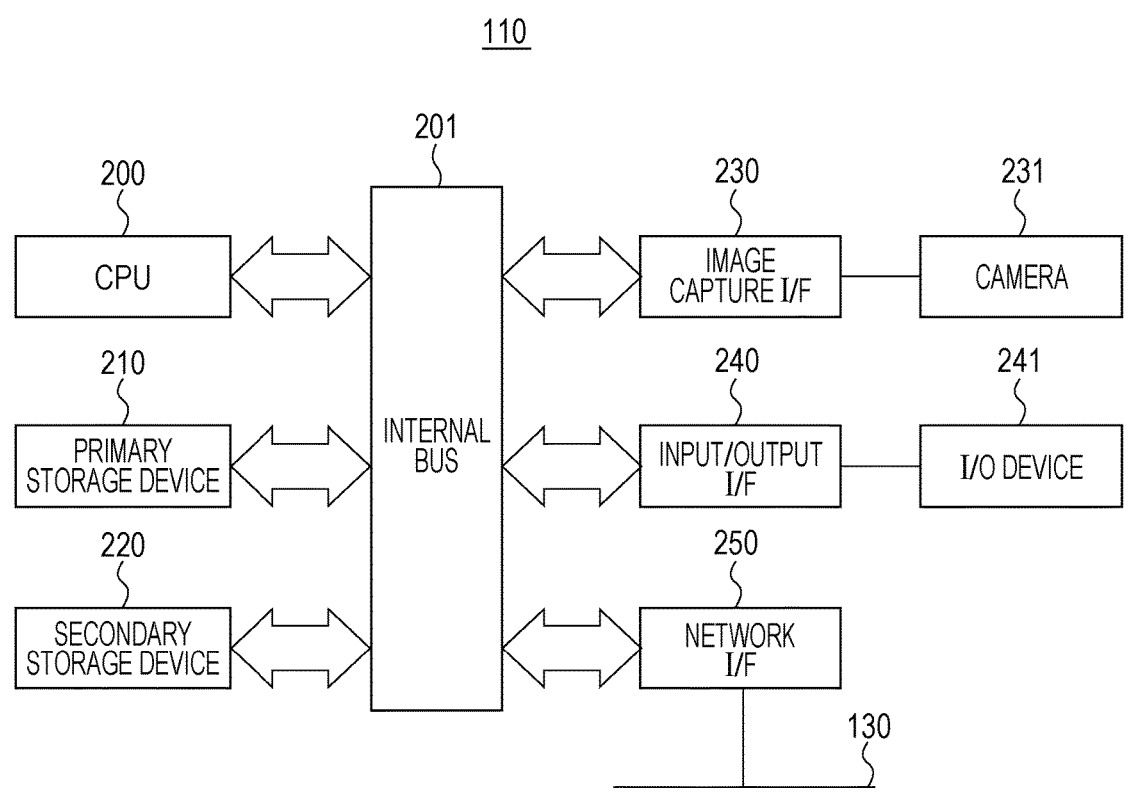
FIG. 2 illustrates an exemplary hardware configuration of a camera server.

FIG. 2 illustrates an exemplary hardware configuration of the camera server 110.

The camera server 110 includes an internal bus 201. The camera server 110 also includes a CPU 200, a primary storage device 210, a secondary storage device 220, and interfaces (I/F) 230 to 250, all of which are connected to the internal bus 201. More specifically, the camera server 110 includes interfaces (I/Fs) including an image capture I/F 230, an input/output I/F 240 and a network I/F 250. The camera server 110 also includes a camera 231 connected to the image capture I/F 230 and an input/output device (I/O device) 241 connected to the input/output I/F 240. The camera 231 is an example image capture unit having a fisheye lens. The camera 231 is configured to generate image data based on light gathered through the fisheye lens.

The CPU 200 is configured to generally control operations performed by the camera server 110.

The primary storage device 210 is a high-speed writable storage device, such as a RAM. An OS (operating system) program, other programs, and data are loaded on the primary storage device 210. The primary storage device 210 is usable by the CPU 200 as a work area for execution of an OS program and other programs.

The secondary storage device 220 is a nonvolatile storage device, such as an FDD, an HDD, a flash memory, and a CD-ROM drive. The secondary storage device 220 is usable as a permanent storage area for an OS program, other programs, and data, and is also usable as a short-term storage area for data.

The image capture I/F 230 is configured to convert and compress image data of an image captured by the camera 231 connected to the image capture I/F 230 to a predetermined format and can, for example, transfer the image data to the secondary storage device 220 (or primary storage device 210). The camera 231 is an image capture unit in which a viewing angle for image capturing and a zoom position can be adjusted.

The input/output I/F 240 is configured, via the I/O device 241, to receive a signal or an interruption from an external apparatus and output a signal to an external apparatus.

The network I/F 250 is an interface that connects the camera server 110 to the network 130 and is usable for communication with the viewer client 120, for example, over the network 130.

The CPU 200 can execute an OS program or other programs stored in the secondary storage device 220 and loaded to the primary storage device 210 to implement functionality of the camera server 110.

Figure 3:
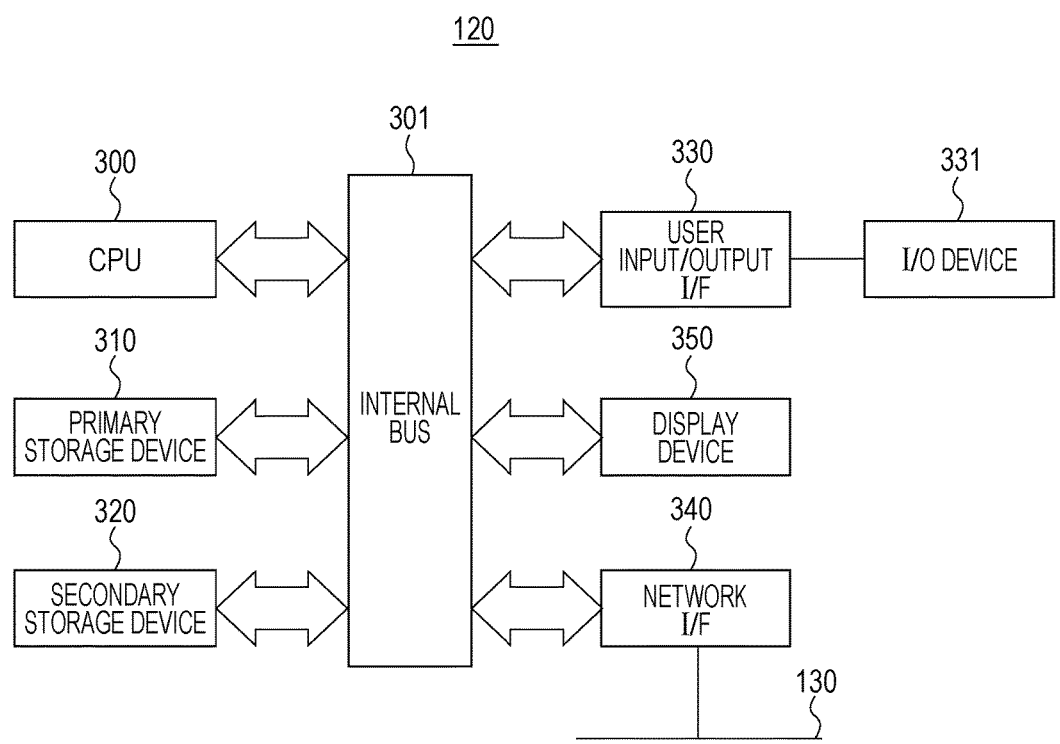
FIG. 3 illustrates an exemplary hardware configuration of a viewer client.

FIG. 3 illustrates an exemplary hardware configuration of the viewer client 120.

The viewer client 120 includes an internal bus 301. The viewer client 120 includes a CPU 300, a primary storage device 310, a secondary storage device 320, a user input/output I/F 330, and a network I/F 340, all of which are connected to the internal bus 301. The viewer client 120 also includes an input/output device (I/O device) 331 connected to the user input/output I/F 330.

The CPU 300 generally controls operations performed in the viewer client 120. The CPU 300 can execute an OS program or other programs stored in a secondary storage device 320 and loaded to a primary storage device 310 to implement functionality of the viewer client 120 and the processes illustrated in the flowcharts of FIGS. 8 and 11.

The primary storage device 310 is a high-speed writable storage device, such as a RAM. An OS program, other programs, and data are loaded on the primary storage device 310. The primary storage device 310 is usable by the CPU 300 as a work area for execution of an OS program and other programs.

The secondary storage device 320 is a nonvolatile storage device, such as an FDD, an HDD, a flash memory, and a CD-ROM drive. The secondary storage device 320 is usable as a permanent storage area for an OS program, other programs, and data, and is also usable as a short-term storage area for data.

The user input/output I/F 330 is usable for input/output to and from a user through the I/O device 331 connected to the user input/output I/F 330. The I/O device 331 can be an input/output device, including a keyboard and a mouse, for example.

The network I/F 340 is an interface that connects to the network 130 and is usable for communication with the camera server 110, for example, over the network 130.

A display device 350 is an image display device that displays an image based on image data captured by the camera server 110. The display device 350 is an example display unit.

Figure 4A:
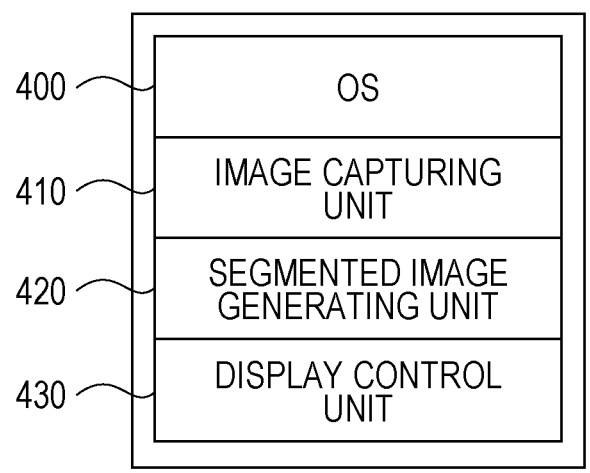
FIGS. 4A and 4B illustrate an exemplary software configuration of the camera server.
Figure 4B:
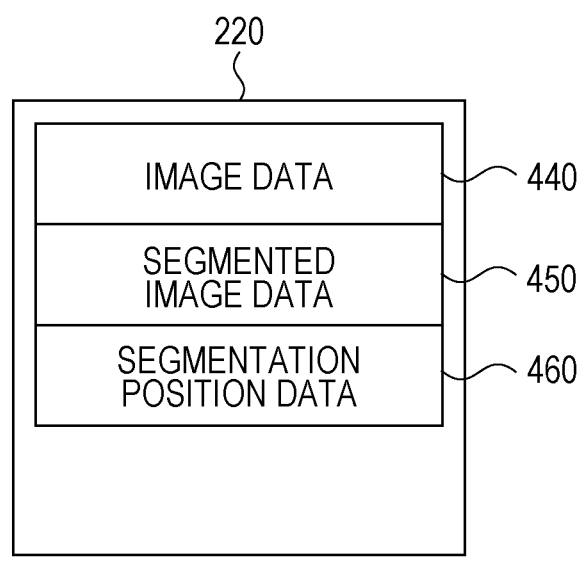

FIGS. 4A and 4B illustrate exemplary software configurations of the camera server 110 and data stored in the secondary storage device 220. More specifically, FIG. 4A illustrates a software configuration implemented by execution of a program for the camera server 110 in the CPU 200. FIG. 4B illustrates data stored in the secondary storage device 220 in the camera server 110.

Programs corresponding to an OS 400, an image capture unit 410, a segmented image generating unit 420, and a display control unit 430 are loaded in the primary storage device 210 and are executed by the CPU 200. The programs for the segmented image generating unit 420 and display control unit 430 are not necessarily stored in the primary storage device 210 in the camera server 110. For example, the program corresponding to the segmented image generating unit 420 and the display control unit 430 can be stored in the primary storage device 310 in the viewer client 120 and can be executed by the CPU 300 in the viewer client 120, which will be described below.

The OS 400 is configured to generally control the camera server 110. The positions (addresses) and sizes of the programs corresponding to the units (400 to 430) in the primary storage device 210 are managed by the OS 400.

The image capture unit 410 performs processing for image capturing in the camera 231 and processes an image captured by the camera 231 based on a received event.

For example, the image capture unit 410 in response to an end-of-image-capturing event from the camera 231 can perform processing for acquiring image data of an image captured by the camera 231 through the image capture I/F 230. The image capture unit 410 can convert and decompress the acquired image data to a predetermined format and perform processing for storing (accumulating) the image data as image data 440 in the secondary storage device 220. The image capture unit 410 in response to a delivery request event over the network 130 from the viewer client 120, as an external apparatus, performs processing for distributing the image data 440 stored in the secondary storage device 220 to the viewer client 120. In this manner, in response to an event for managing the image data 440, the image capture unit 410 performs processing from image capturing of an image (image data) by the camera 231 in the camera server 110 to delivery of the image data over the network 130.

The segmented image generating unit 420 is configured to perform processing for generating segmented image data 450 by using the image data 440 stored in the secondary storage device 220. In this case, the segmented image generating unit 420 determines which position of a fisheye image is to be segmented based on segmentation position data 460 and generate a less-distorted image. In other words, the distorted image is corrected such that the corrected image can appear like an image that was not captured through a fisheye lens. This processing is called a dewarp process.

The segmented image generating unit 420 receives a delivery request event over the network 130 from the viewer client 120, acting as an external apparatus. Then, the segmented image generating unit 420 performs processing for delivering the segmented image data 450 stored in the secondary storage device 220 to the viewer client 120. The segmented image generating unit 420 in response to a request event for changing a segmentation position from the viewer client 120 updates segmentation position data 460 based on event information.

The segmented image generating unit 420 then generates segmented image data 450 based on the updated segmentation position data 460. The segmented image generating unit 420 receives an event for managing the segmented image data 450. Thus, the segmented image generating unit 420 performs processing from generation of segmented image data from the image data 440 to distribution of the segmented image data 450 over the network 130.

The display control unit 430 in response to a request from the viewer client 120 superimposes a mark indicating a direction for moving the segmentation position on the current segmentation position on the image data 440 based on the segmentation position data 460.

As illustrated in FIG. 4B, the secondary storage device 220 in the camera server 110 stores the image data 440, the segmented image data 450, and the segmentation position data 460. The image data 440, the segmented image data 450, and the segmentation position data 460 are not necessarily stored in the secondary storage device 220 in the camera server 110. For example, data corresponding to the image data 440, the segmented image data 450, and the segmentation position data 460 can be stored in the secondary storage device 320 in the viewer client 120, as will be described below.

The image data 440 is image data captured by the camera 231 and is processed in the image capture unit 410. The image data 440 is example image data captured by an image capture unit including a fisheye lens.

The segmented image data 450 is image data generated by the processing performed by the segmented image generating unit 420. The segmented image data 450 is an example of segmented image data of image data captured by an image capture unit including a fisheye lens.

The segmentation position data 460 is coordinates of a position of the center of a segmented image. Information stored in the segmentation position data 460 will be described with reference to FIGS. 5A and 5B.

Figure 5A:
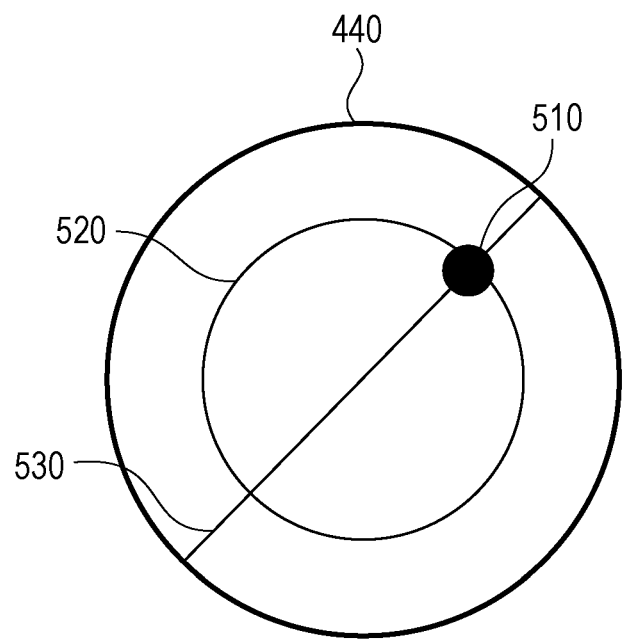
FIGS. 5A and 5B illustrate an example mark indicating a direction of movement of a segmented image according to a first embodiment.

FIG. 5A illustrates a displayed example of a mark indicating the direction of movement of a segmented image superimposed on the image data 440 in a case where the image data 440 relates to a fisheye image captured by an omni-directional camera. The image data 440 may not directly represent a fisheye image captured by an omni-directional camera, but may schematically represent a fisheye image captured by an omni-directional camera. The display control unit 430 is configured to superimpose a segmentation center 510 on the image data 440 based on the segmentation position data 460. The segmentation center 510 is an example of a first object indicating a center position of segmented image data.

The display control unit 430 then superimposes lines (pan additional line 520 and tilt additional line 530) indicating a horizontal/vertical direction of the segmented image as a mark indicating the direction of movement of the segmentation position. The pan additional line 520 and/or tilt additional line 530 is an example of a second object indicating a range for enabling a segmentation position of segmented image data to be moved in a predetermined direction. In this case, the pan additional line indicating a horizontal direction of a segmented image is rendered as a circle with its center at the center of the image data 440 and its radius being a distance from the center of the image data 440 to the center of the segmentation position.

The tilt additional line indicating a vertical direction of a segmented image is rendered as a line segment passing through the center of the image data 440 and the center of the segmentation position. The following embodiments assume that both the pan additional line 520 and tilt additional line 530 are superimposed. In other embodiments, only one of them may be superimposed.

Figure 5B:
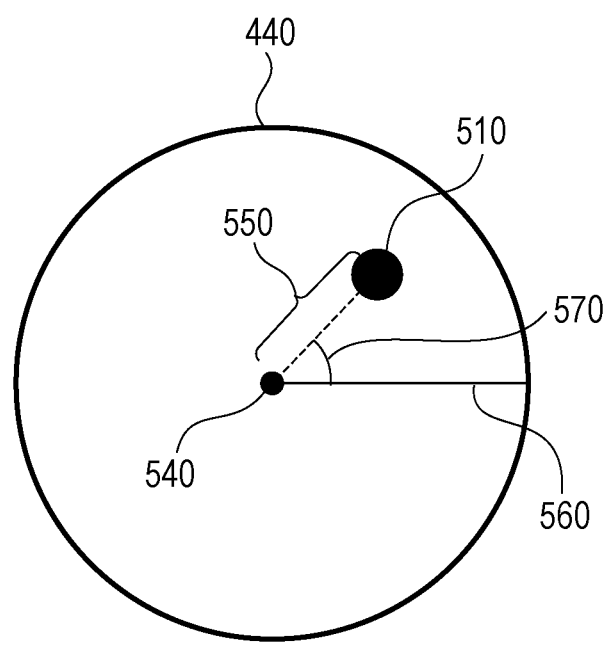

FIG. 5B illustrates an example of information stored in the segmentation position data 460 as described above. In a case where the image data 440 is a fisheye image captured by an omni-directional camera, for example, the segmentation position data 460 stores a distance 550 between center coordinates 540 of the image data 440 and a segmentation center 510. The segmentation position data 460 stores a reference line 560 connecting the center coordinates 540 of the image data 440 and one point on a horizontal line of the image data 440 and an angle 570 of a line segment connecting the center coordinates 540 of the image data 440 and the segmentation center 510.

Figure 6A:
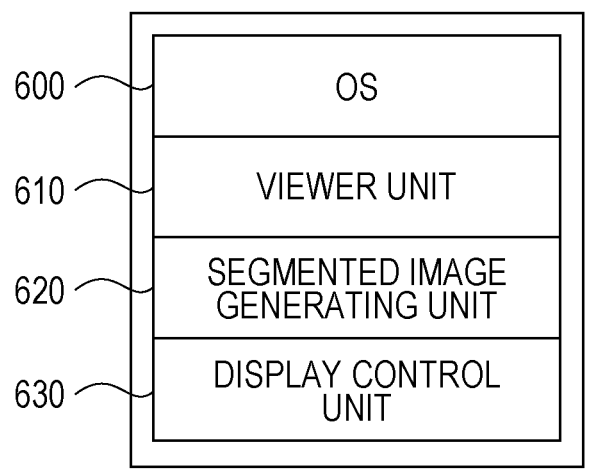
FIGS. 6A and 6B illustrate an exemplary software configuration of the viewer client.
Figure 6B:
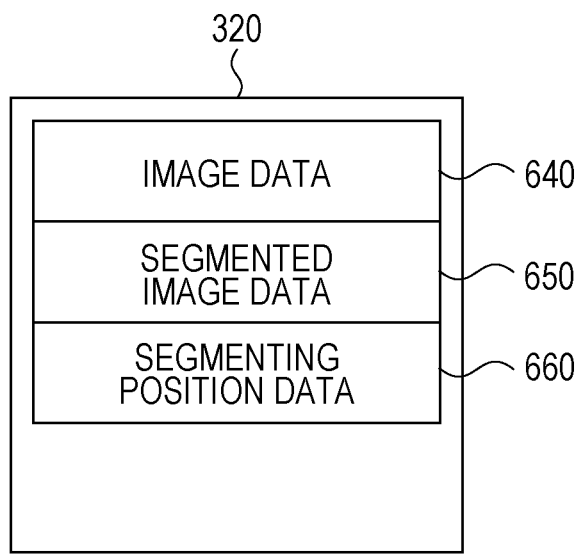

FIGS. 6A and 6B illustrates an example software configuration of the viewer client 120 and an example of data stored in the secondary storage device 320. More specifically, FIG. 6A illustrates a software configuration implemented by execution of a program for the viewer client 120 by the CPU 300. FIG. 6B illustrates data stored in the secondary storage device 320 in the viewer client 120.

Programs for an OS 600 and a viewer unit 610 are loaded to the primary storage device 310. Programs for a segmented image generating unit 620 and a display control unit 630 are loaded to the primary storage device 310 instead of the program for the segmented image generating unit 420 and the display control unit 430 in the camera server 110. These programs are executed by the CPU 300.

The OS 600 is configured to generally control the viewer client 120. The positions (addresses) and sizes of the programs corresponding to the units (610 to 630) in the primary storage device 310 are managed by the OS 600.

The viewer unit 610 is configured to perform processing for displaying an image based on image data captured by the camera server 110, a segmented image, and a mark indicating the direction of movement of the segmented image. The viewer unit 610 includes a user interface function for displaying a user interface on the display device 350. The user interface display performed by the user interface function can include displaying a moving image and displaying a still image from the camera server 110 and displaying a moving image, displaying a still image and displaying of a stored image based on a user operation. The user interface display by the user interface function can also include displaying a segmented image and displaying a mark indicating the direction of movement of a segmented image. The user interface can be a CUI, a GUI, or a web application, for example. An interface such as a CUI, a GUI or a web application can be provided by the display control unit 430 in the camera server 110, for example.

The segmented image generating unit 620 and the display control unit 630 in FIG. 6A can be equivalent to the segmented image generating unit 420 and the display control unit 430 in FIG. 4A, respectively.

As illustrated in FIG. 6B, the segmented image data 650 and segmentation position data 660 can be stored in the secondary storage device 320 as required instead of the segmented image data 450 and segmentation position data 460, respectively, in the secondary storage device 310 in the camera server 110.

The segmented image data 650 and the segmentation position data 660 in FIG. 6B are equivalent to the segmented image data 450 and segmentation position data 460, respectively, in FIG. 4B. For example, the segmented image data 650 can be generated by processing performed by the segmented image generating unit 620, and the segmentation position data 660 can be generated using the segmented image generating unit 620. The image data 640 is equivalent to the image data 440.

Figure 7A:
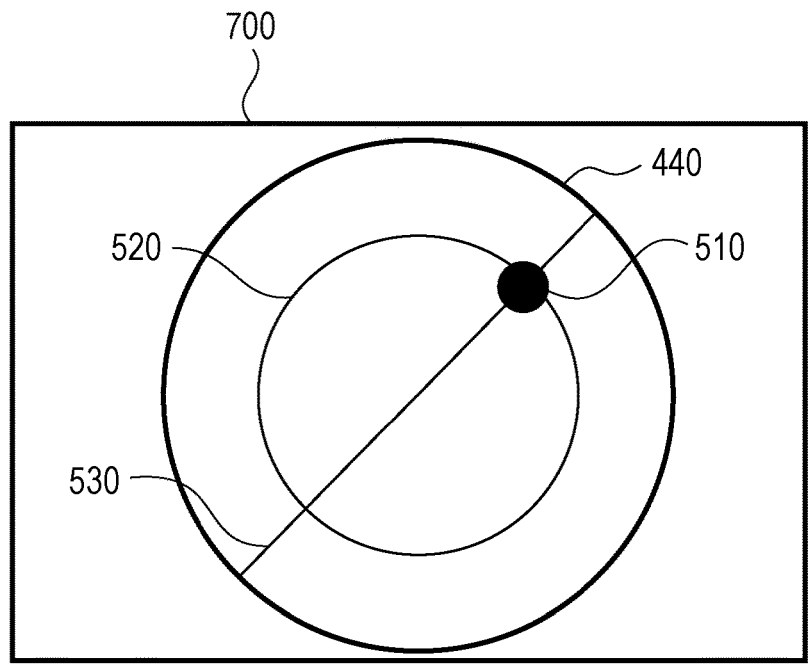
FIGS. 7A and 7B illustrate an example GUI according to the first embodiment.
Figure 7B:
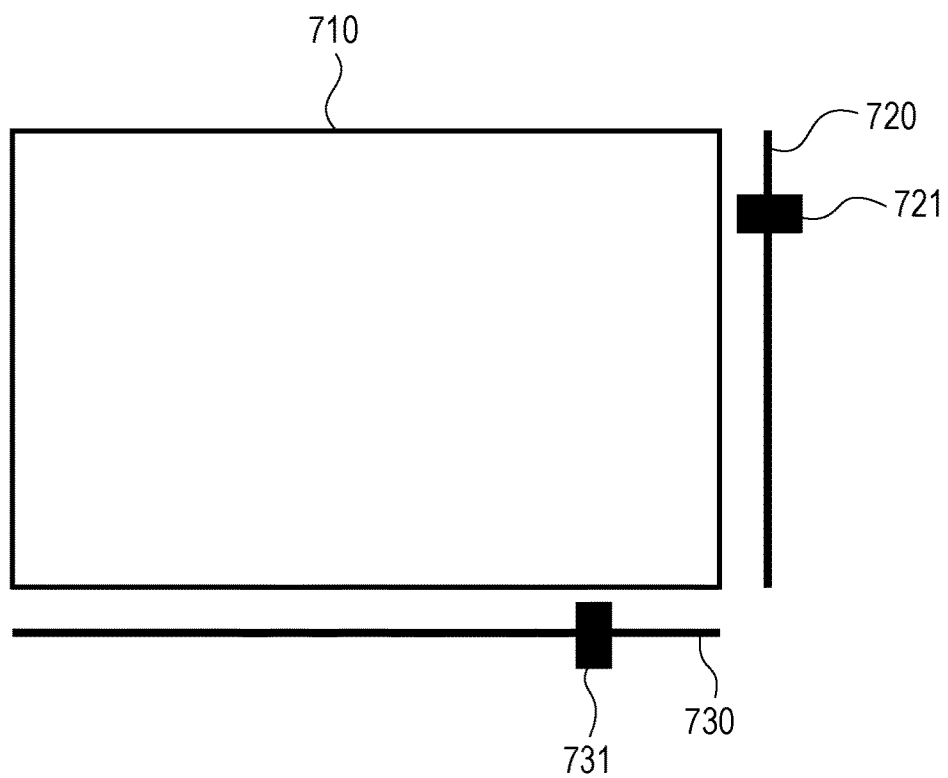

FIGS. 7A and 7B illustrate GUI examples of the first embodiment to be displayed on the display device 350 by the viewer unit 610. The GUIs in FIGS. 7A and 7B are displayed by the display control unit 630, for example. An image data display area 700 displays the image data 440 acquired from the camera server 110. In this case, the center 510 of the segmentation position, the pan additional line 520 and the tilt additional line 530 are superimposed on the image data 440 on the image data display area 700. The segmented image display area 710 displays the segmented image data 450 acquired from the camera server 110.

A tilt slider 720 is configured to indicate a value of a tilt (hereinafter, called a tilt value) at the current segmentation position. A tilt knob 721 can be moved using the I/O device 331, such as a mouse, to change the value of the tilt of the segmentation position. In other words, when the tilt value is changed, the segmented image generating unit 620 changes the segmentation position in a vertical direction (tilt direction) on an image having undergone a dewarp process (or distortion correction). According to the present embodiment, the expression "change in a tilt direction" can refer not only to an actual movement of an image capturing direction of a PTZ camera in a tilt direction, but also to a change of a segmentation position in a vertical direction of an image having undergone a dewarp process.

A pan slider 730 indicates a value of a pan (hereinafter, called a pan value) at a current segmentation position. A pan knob 731 can be moved using the I/O device 331, such as a mouse, to change a value of a pan (hereinafter, called a pan value) at a segmentation position. In other words, when the pan value is changed, the segmented image generating unit 620 changes the segmentation position in a horizontal direction (pan direction) on an image having undergone a dewarp process (distortion correction). According to the present embodiment, the expression "change in a pan direction" can refer not only to an actual movement of an image capturing direction of a PTZ camera in a pan direction, but also to a change of a segmentation position in a horizontal direction of an image having undergone a dewarp process.

Figure 8:
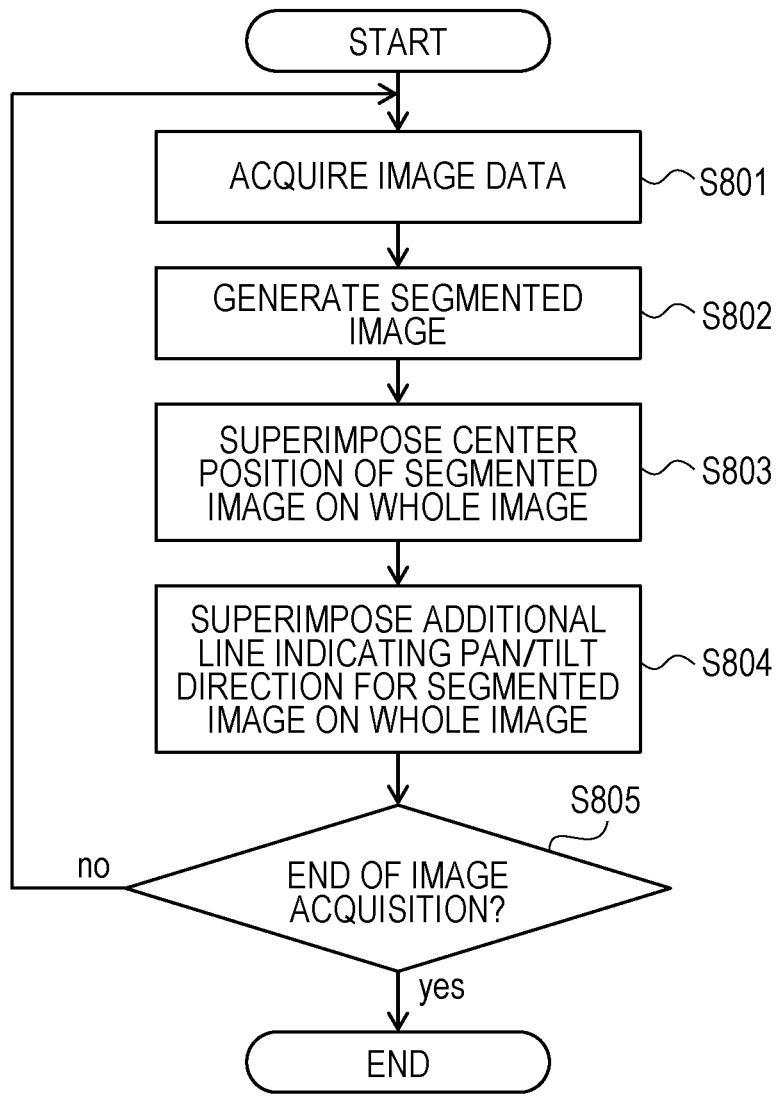
FIG. 8 is a flowchart illustrating exemplary information processing according to the first embodiment.

FIG. 8 is a flowchart illustrating an example of information processing according to the first embodiment. The processing of the flowchart illustrated in FIG. 8 is implemented by invoking and executing the segmented image generating unit 420 and display control unit 430 for the camera server 110 from the viewer unit 610, for example.

In another embodiment, processing can be performed in the segmented image generating unit 620 and the display control unit 630 on the viewer client 120, as described above, instead of the segmented image generating unit 420 and the display control unit 430. For simplicity, the following descriptions assume that the segmented image generating unit 620 and the display control unit 630 perform processing on the viewer client 120. In S801, the viewer unit 610 issues an image capturing start event to the image capture unit 410 over the network 130. The image capture unit 410, in response to the event, acquires image data 440 from the camera 231 through the image capture I/F 230 and transmits it to the viewer unit 610 over the network 130. Next, the viewer unit 610 displays the received image data 440 on the image data display area 700.

Next in S802, the segmented image generating unit 620 reads segmentation position data 660 and generates segmented image data 650 based on information in the segmentation position data 660. The generated segmented image data 650 is stored in the primary storage device 310 and is displayed on the segmented image display area 710 by the viewer unit 610.

In S803, the display control unit 630 superimposes the center 510 of the current segmentation position on the image data display area 700 based on the segmentation position data 660.

In S804, the display control unit 630 superimposes marks indicating directions of movement of the center of the segmentation position based on the segmentation position data 660. According to the present embodiment, referring to FIGS. 5A and 5B, the pan additional line 520 and the tilt additional line 530 correspond to the marks indicating directions of movement of the center of a segmentation position.

Next in S805, the viewer unit 610 determines whether the image acquisition is to be continued. If it is determined that the image acquisition is to be continued (no in S805), the viewer unit 610 moves the processing to S801. If it is determined that the image acquisition is to end (yes in S805), the processing in FIG. 8 ends.

The information processing according to the present embodiment superimposes the marks, such as the pan additional line 520 and tilt additional line 530 according to the present embodiment, indicating directions of movement of the segmented image data 450 on the image data 440 for display on the image data display area 700. As a result, a user can intuitively recognize the direction of movement of the center 510 of the current segmentation position on the image data 440 based on an operation performed by the user.

Second Embodiment

Display forms of the pan additional line 520, the tilt additional line 530, the tilt slider 720, and the pan slider 730 on the image data display area 700 will be described according to a second embodiment. The pan additional line 520 and the tilt additional line 530 are displayed in different colors and different shapes, and, based on them, the colors and shapes of the pan slider 730 and tilt slider 720 are determined. The term "shape" can refer to a waved line or a dotted line, for example.

Figure 9A:
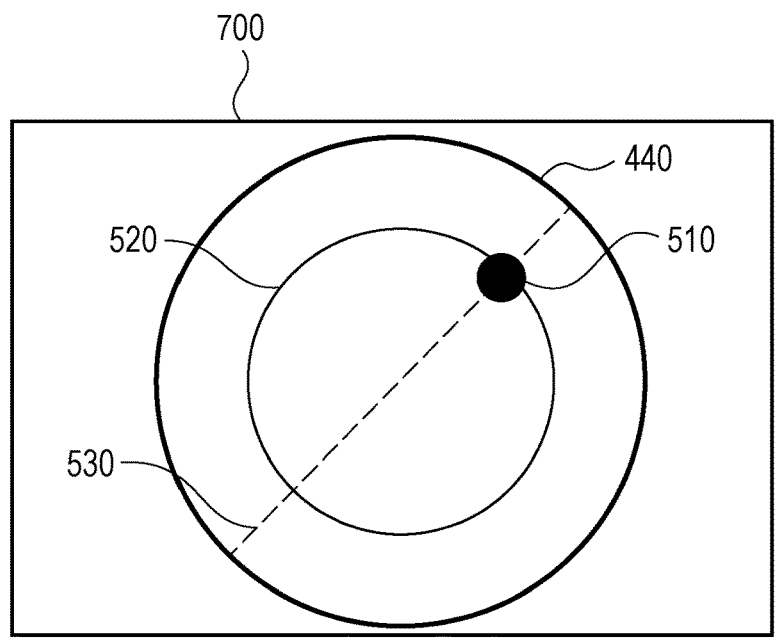
FIGS. 9A and 9B illustrate an example GUI according to a second embodiment.
Figure 9B:
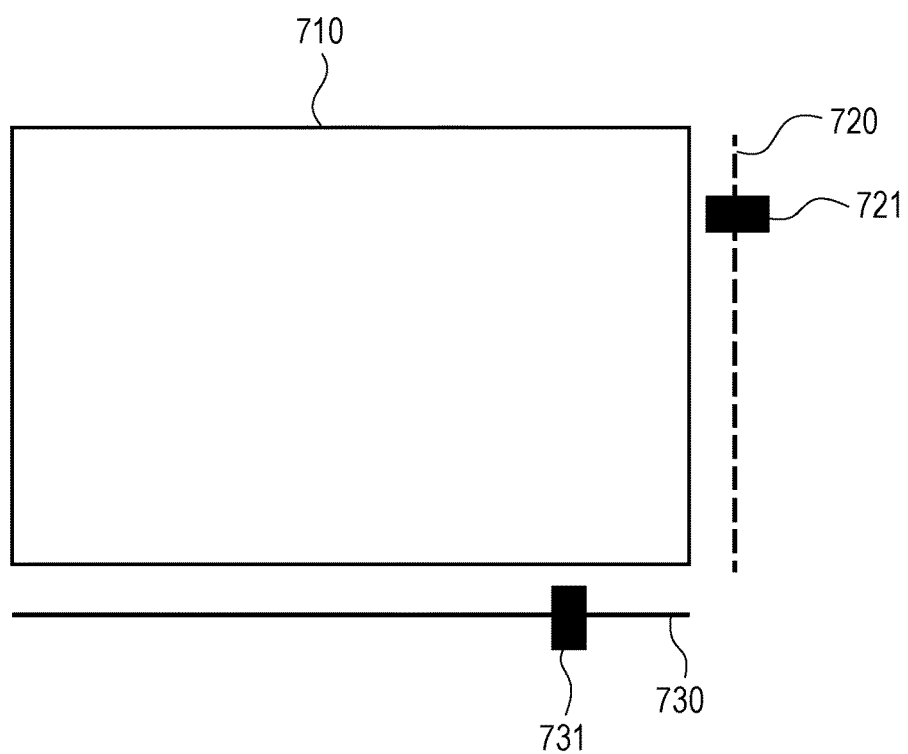

FIGS. 9A and 9B illustrate example GUIs according to the second embodiment in which the viewer unit 610 is displayed on the display device 350.

Referring to FIGS. 9A and 9B, the tilt additional line 530 and the tilt slider 720 are both displayed in dotted lines. Thus, a user can intuitively recognize which of the two additional line superimposed on the image data 440 corresponds to a tilt (or pan) additional line. Referring to FIGS. 9A and 9B, the pan slider 730 and the tilt slider 720 are displayed in the vicinity of the segmented image display area 710. "Vicinity" can, for example, refer to an area within a predetermined range from the segmented image display area 710.

Third Embodiment

A third embodiment including a plurality of segmentation positions will now be described.

Figure 10A:
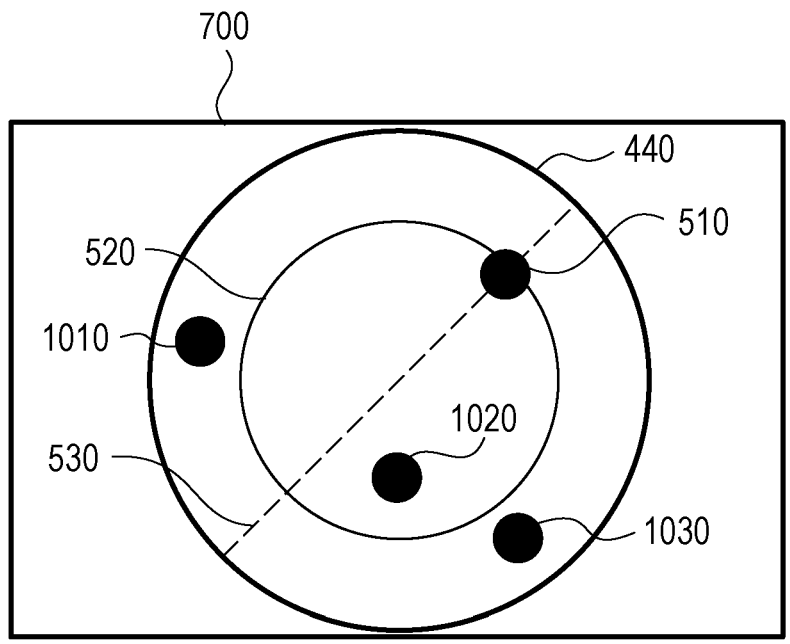
FIGS. 10A and 10B illustrate an example GUI according to a third embodiment.
Figure 10B:
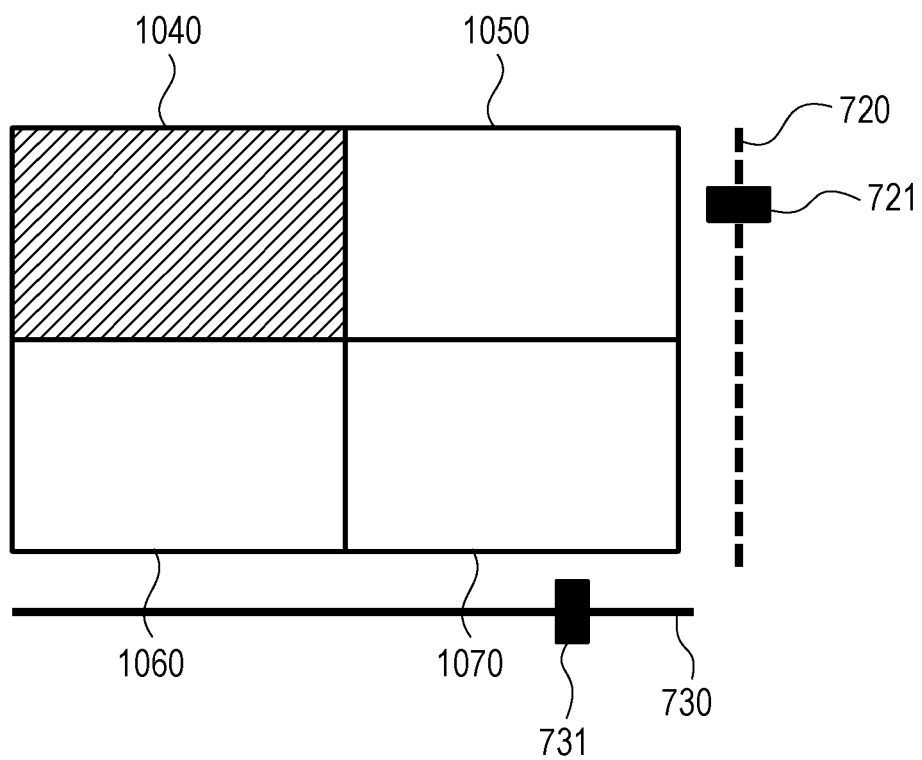

FIGS. 10A and 10B illustrate a GUI example according to a third embodiment that are displayed on the display device 350 by the viewer unit 610. The GUI example in FIGS. 10A and 10B displayed by the viewer unit 610 includes four segmentation positions, and the center 510 of the segmentation position among them only includes a flag (additional line display flag) displaying the pan additional line 520 and the tilt additional line 530. FIGS. 10A and 10B illustrate a GUI example including a plurality of segmented image data pieces.

Segmented image display areas 1040, 1050, 1060, and 107 correspond to segmentation position centers 510, 1010, 1020, and 1030, respectively.

The segmentation position data 660 stores, for each segmentation center position, a flag indicating whether an additional line is to be rendered on the image data 440 in addition to a radius and an angle indicating coordinates of the position of a segmentation center. For example, in a case where a user operates the I/O device 331 to select the segmented image display area 1040, segmentation position data regarding the segmented image display area 1040 stores the flag indicating whether an additional line is to be rendered on the image data 440. In a case where a user operates the I/O device 331 to select a segmented image display area 1050, the flag in the segmentation position data regarding the segmented image display area 1040 is deleted, and the segmentation position data regarding the segmented image display area 1050 stores the flag.

Figure 11:
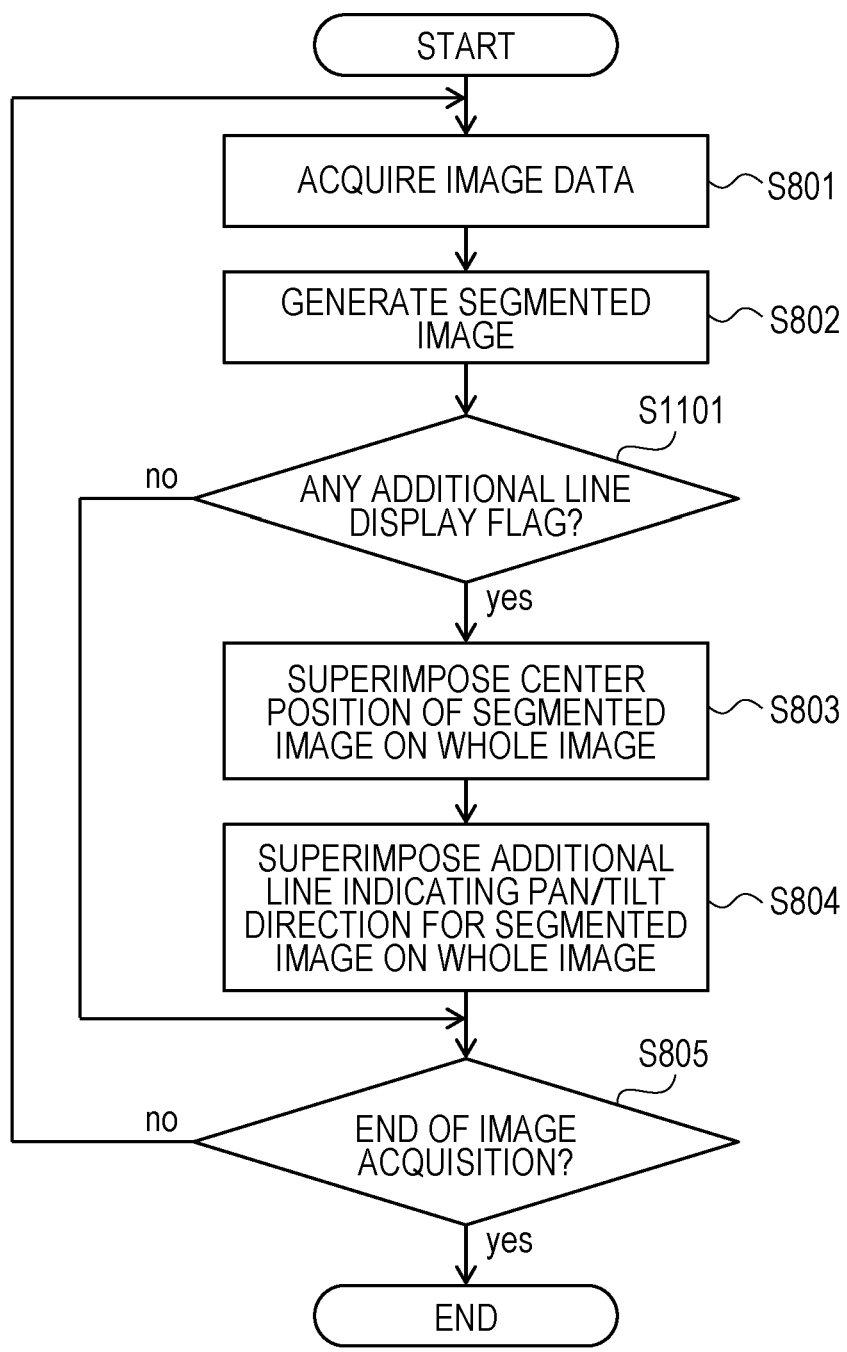
FIG. 11 is a flowchart illustrating exemplary information processing according to the third embodiment.

FIG. 11 is a flowchart illustrating an example of information processing according to the third embodiment. The flowchart illustrated in FIG. 11 reflects a configuration in which the processing is executed by the segmented image generating unit 620 and display control unit 430 on the viewer client 120. In another embodiment, the processing can be implemented by invoking and executing the segmented image generating unit 420 and display control unit 430 for the camera server 110 from the viewer unit 610.

According to the present embodiment, the processing on the flowchart can be implemented for each of a plurality of segmentation positions stored in the segmentation position data 660.

Referring to FIG. 11, the processing in S801, S803, S804 and S805 is equivalent to the processing in FIG. 8, and thus a detailed description is omitted herein.

In S802, the segmented image data 650 is generated and displayed on the segmented image display area 710 by the viewer unit 610. The viewer unit 610 then advances the processing to S1101.

In S1101, the viewer unit 610 determines whether the flag exists indicating whether an additional line is to be rendered, where the flag corresponds to the current segmentation position. If the flag exists (yes in S1101), the viewer unit 610 advances the processing to S803. If the flag does not exist (no in S1101), the viewer unit 610 advances the processing to S805.

According to the present embodiment, in a case where there are a plurality of segmentation positions, additional lines corresponding thereto are superimposed based on the flag, and a user can intuitively recognize the centers 510, 1010, 1020 and 1030 of the segmentation positions.

Referring to the example in FIGS. 10A and 10B, marks indicating the center positions of segmented image data pieces are superimposed on the image data pieces (or images). The display control unit 430 can, for example, superimpose on the image data pieces a mark indicating the center position of the segmented image data including the flag set in black and a mark indicating the center position of the segmented image data without a flag set in a different color or a different shape, such as a broken or dotted line.

Fourth Embodiment

Figure 12A:
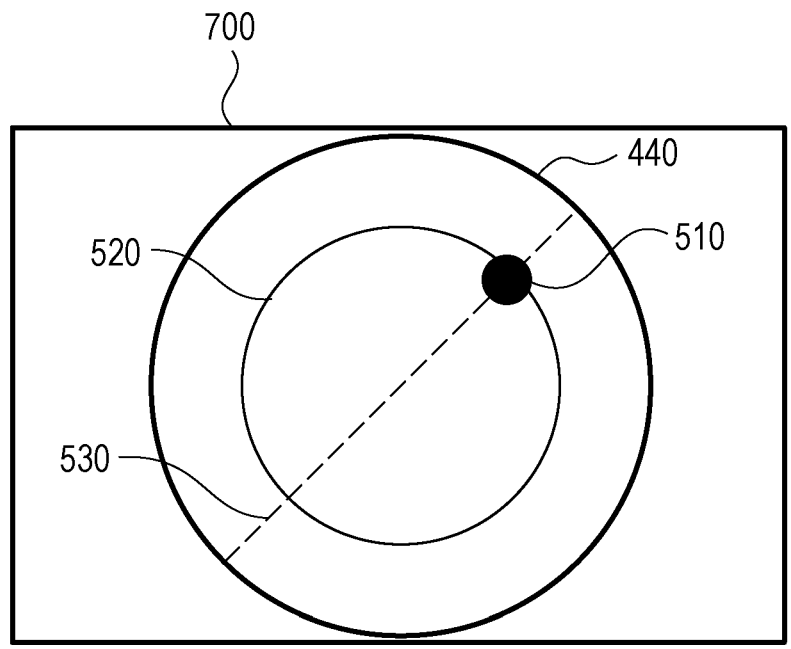
FIGS. 12A and 12B illustrate an example GUI according to a fourth embodiment.
Figure 12B:
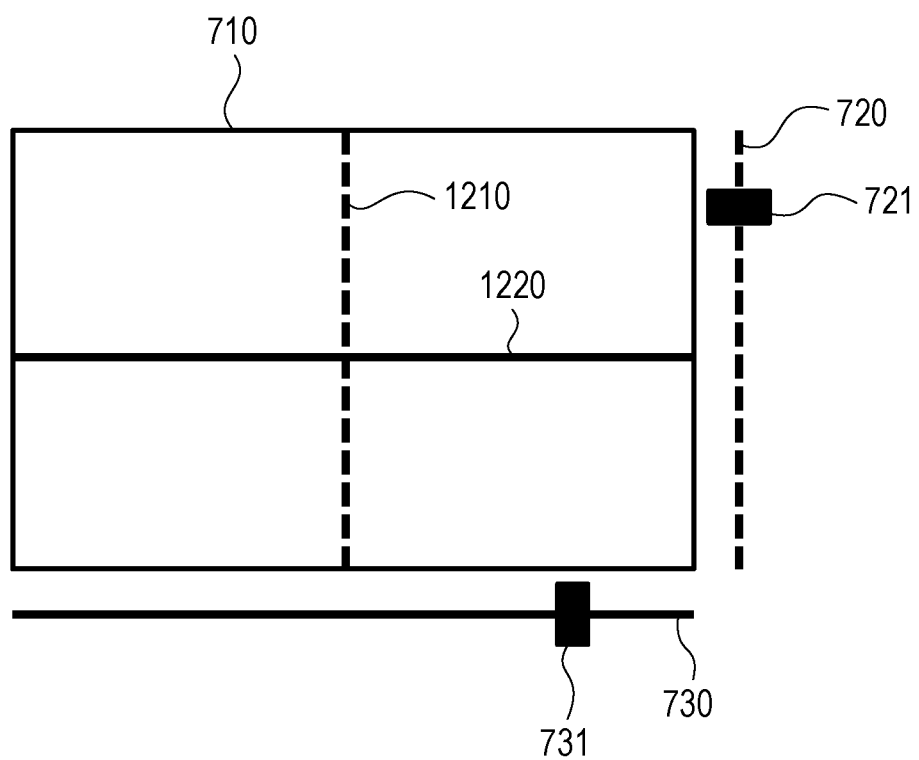

According to a fourth embodiment, additional lines indicating pan and tilt directions are superimposed on the segmented image display area 710. FIGS. 12A and 12B illustrate an example GUI, according to the fourth embodiment, displayed on the display device 350 by the viewer unit 610.

A tilt additional line 1210 is superimposed on the center in a horizontal direction of the segmented image display area 710. The tilt additional line 1210 indicates the same direction of movement as that of the tilt additional line 530 superimposed on the image data display area 700.

A pan additional line 1220 is superimposed on the center in a vertical direction of the segmented image display area 710. The pan additional line 1220 indicates the same direction of movement as that of the pan additional line 520 superimposed on the image data display area 700.

According to the present embodiment, an additional line superimposed on the image data display area 700 and an additional line superimposed on the segmented image display area 710 are displayed correspondingly to a pan direction and a tilt direction, respectively. Therefore, a user can intuitively recognize the directions of movement of the image data 440 and the segmented image data 450.

The present embodiment assumes that the viewer unit 610 or the display control unit 630 superimposes both the tilt additional line 1210 and the pan additional line 1220 on a segmented image (on a partial image).

As illustrated in FIGS. 12A and 12B, the viewer unit 610 or the display control unit 630 displays dotted lines in addition to the tilt additional line 530, the tilt slider 720, and the tilt additional line 1210. Thus, a user can intuitively recognize the corresponding tilt (or pan) additional line between two additional lines superimposed on the image data 440 and the segmented image. The tilt additional line 1210 and/or the pan additional line 1220 are examples of a third object representing a range for enabling a segmentation position of segmented image data to be moved in a predetermined direction.

Fifth Embodiment

Figure 13A:
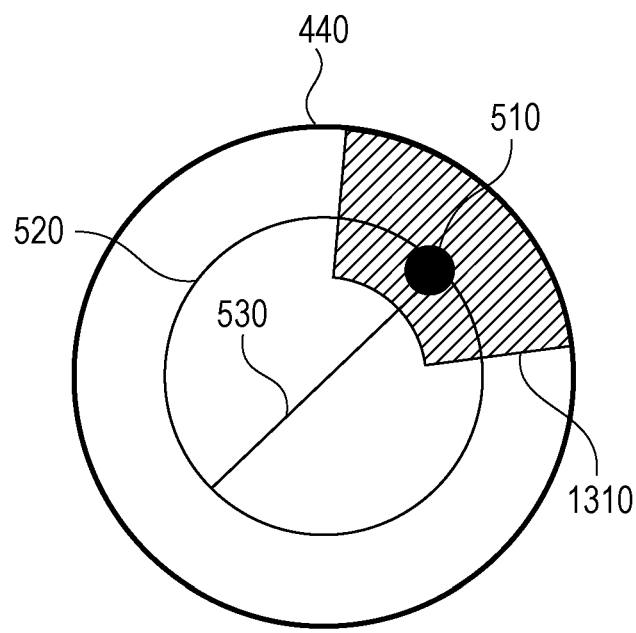
FIGS. 13A and 13B illustrate an example tilt additional line displayed on image data.
Figure 13B:
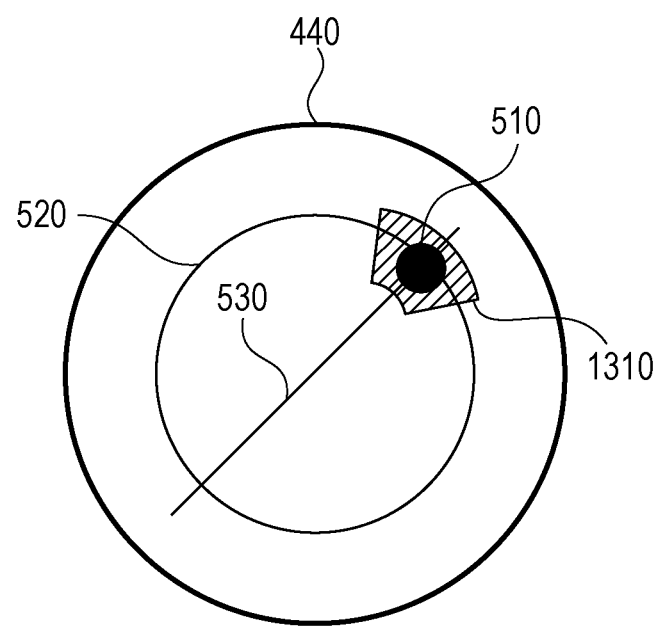

A case where the size of the segmentation area 1310 is changed according to a fifth embodiment will now be described. FIGS. 13A and 13B illustrate an example tilt additional line displayed on image data 440 in a case where the segmentation area 1310 is changed.

According to the present embodiment, the size of a segmentation area is stored as segmentation position data 460 that includes a radius and an angle indicating coordinates of the position of a segmentation center.

The flow of information processing performed by the viewer unit 610 according to the present embodiment is the same as the processing on the flowchart illustrated in FIG. 8.

Referring to FIG. 8, in S804, the display control unit 630 calculates a tilt range in which the center 510 of a segmentation position is movable based on the size of the corresponding segmentation area, which is included in the segmentation position data 660, determines the length of a tilt additional line based on the calculated result, and superimposes the tilt additional line on the segmentation area.

The processing according to the present embodiment superimposes the tilt additional line 530, which indicates a tilt movable range, on the image data 440 so that a user can intuitively operate thereon.

The above-described embodiments are not seen to be limiting The above-described embodiments can arbitrarily be combined for implementation.

The information processing according to any one of the above-described embodiments, for example, enable a user to intuitively understand a relationship between a fisheye image and a direction of movement of a segmentation position. A user can also intuitively understand a positional relationship between one image and an image corresponding to a part of the image.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been provided, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-251042 filed Dec. 26, 2016, which is hereby incorporated by reference herein in its entirety.

What is claimed is:

1. An information processing apparatus that controls a display unit so as to display a fisheye image captured by an image capturing unit, the apparatus comprising:
    a display control unit configured to superimpose a first object on the fisheye image, the first object indicating a position of a partial image corresponding to a part of the fisheye image;
    a reception unit configured to receive an instruction for moving the position of the partial image in a horizontal direction of the partial image; and
    wherein the display control unit superimposes, on the fisheye image, a second object that is circular and corresponds to a locus of the position of the partial image in a case where the position of the partial image is moved in accordance with the instruction.

2. The information processing apparatus according to claim 1, wherein, in a case where the image includes a plurality of partial images, the display control unit superimposes first objects indicating center positions of the partial images on the fisheye image, and superimposes the second object for a selected one of the plurality of partial image on the fisheye image and does not superimpose the second object for a non-selected one or more of the plurality of partial image on the fisheye image.

3. The information processing apparatus according to claim 1, wherein, in a case where the image includes a plurality of partial images, the first display control unit superimposes on the fisheye image a first object indicating a center position of a selected one of the plurality of partial images in a different color or a different shape from a first object indicating a center position of an unselected one of the partial images, and superimposes on the fisheye image the second object for a selected one of the plurality of partial images.

4. The information processing apparatus according to claim 1, wherein, in a case where a size of the partial image of the fisheye image is changed, the display control unit changes a range indicated by the second object and superimposes the second object on the fisheye image.

5. The information processing apparatus according to claim 1, wherein the display control unit superimposes the circular object and a linear object in the shape of a line passing through the center of the fisheye image in a vertical direction of the partial image, on the fisheye image, as the second object.

6. The information processing apparatus according to claim 5, wherein the display control unit superimposes on the fisheye image the circular object and the linear object in colors or shapes different from each other.

7. The information processing apparatus according to claim 6, wherein the display control unit displays a slider indicating the horizontal direction of the partial image on the fisheye image in a color or a shape identical to that of the circular object in a vicinity of the partial image and displays a slider indicating the vertical direction of the partial image on the fisheye image in a color or a shape identical to that of the linear object in a vicinity of the partial image.

8. The information processing apparatus according to claim 1, wherein the display control unit superimposes on the partial image a third object indicating a range for enabling the position of the partial image on the fisheye image to be moved in a predetermined direction.

9. The information processing apparatus according to claim 8, wherein the display control unit superimposes on the partial image an object indicating the horizontal direction and an object indicating the vertical direction as the third object.

10. The information processing apparatus according to claim 8, wherein the display control unit superimposes on the partial image an object indicating the horizontal direction and an object indicating the vertical direction as the third object.

11. The information processing apparatus according to claim 10, wherein the display control unit superimposes on the partial image the object indicating the horizontal direction and the object indicating the vertical direction in colors or shapes different from each other.

12. An information processing method executed by an information processing apparatus that controls a display unit so as to display a fisheye image captured by an image capturing unit, the method comprising:
   superimposing a first object on the fisheye image, the first object indicating a position of a partial image corresponding to a part of the fisheye image; and
   receiving an instruction for moving the position of the partial image in a horizontal direction of the partial image; and
   wherein the superimposing superimposes, on the fisheye image, a second object that is circular and corresponds to a locus of the position of the partial image in a case where the position of the partial image is moved in accordance with the instruction.

13. An information processing apparatus that controls a display unit so as to display a fisheye image captured by an image capturing unit, the apparatus comprising:
   a reception unit configured to receive an instruction for moving a position of a partial image in a horizontal direction of the partial image, the partial image corresponds to a part of the fisheye image; and
   a display control unit configured to superimpose, on the fisheye image, an object that is circular and corresponds to a locus of the position of the partial image in a case where the position of the partial image is moved in accordance with the instruction.

14. An information processing method executed by an information processing apparatus that controls a display unit so as to display a fisheye image captured by an image capturing unit, the method comprising:
   receiving an instruction for moving a position of a partial image in a horizontal direction of the partial image, the partial image corresponds to a part of the fisheye image; and
   superimposing, on the fisheye image, an object that is circular and corresponds to a locus of the position of the partial image in a case where the position of the partial image is moved in accordance with the instruction.

15. A non-transitory computer-readable storage medium that stores a program of instructions for performing an information processing method using an information processing apparatus, the method controlling a display unit so as to display a fisheye image captured by an image capturing unit, the method comprising:
   superimposing a first object on the fisheye image, the first object indicating a position of a partial image corresponding to a part of the fisheye image; and
   receiving an instruction for moving the position of the partial image in a horizontal direction of the partial image; and
   wherein the superimposing superimposes, on the fisheye image, a second object that is circular and corresponds to a locus of the position of the partial image in a case where the position of the partial image is moved in accordance with the instruction.

16. A non-transitory computer-readable storage medium that stores a program of instructions for performing an information processing method using an information processing apparatus, the method controlling a display unit so as to display a fisheye image captured by an image capturing unit, the method comprising:
   receiving an instruction for moving a position of a partial image in a horizontal direction of the partial image, the partial image corresponds to a part of the fisheye image; and
   superimposing, on the fisheye image, an object that is circular and corresponds to a locus of the position of the partial image in a case where the position of the partial image is moved in accordance with the instruction.

* * * * *